Nov. 1, 1949.     B. BRITTAIN ET AL     2,486,586
FLUSH HANDLE CONSTRUCTION
Filed March 5, 1946                2 Sheets-Sheet 1
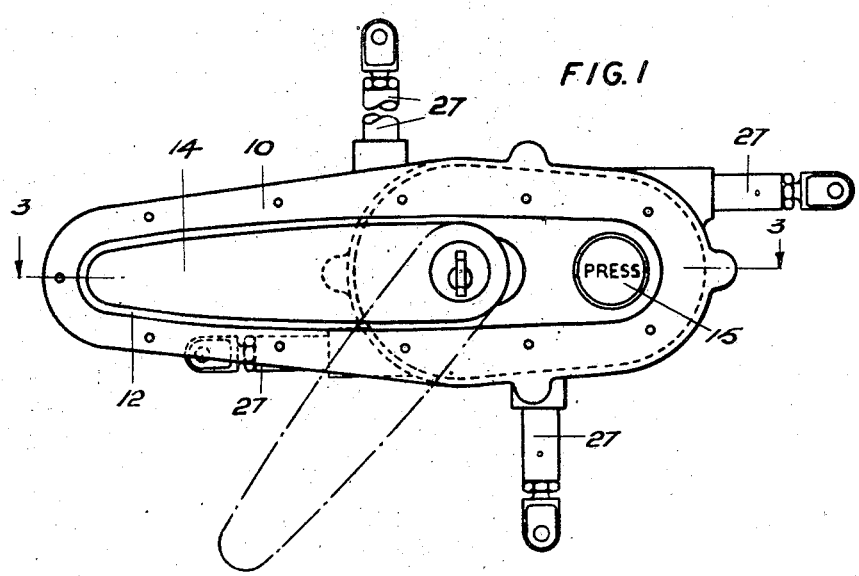
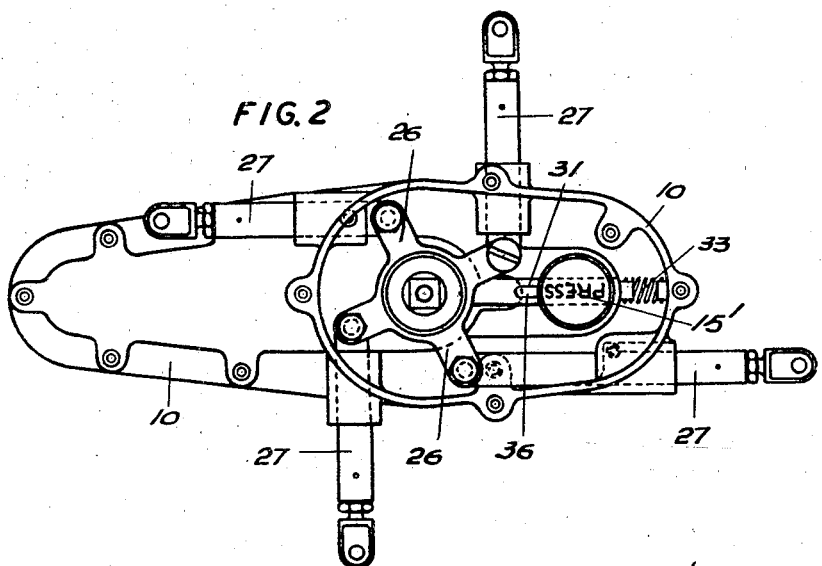
INVENTORS
BERT BRITTAIN
HENRY JAMES GOODWIN SQUIRE
by Walter S. Bleston
ATTORNEY Nov. 1, 1949.  B. BRITTAIN ET AL  2,486,586
FLUSH HANDLE CONSTRUCTION
Filed March 5, 1946  2 Sheets-Sheet 2
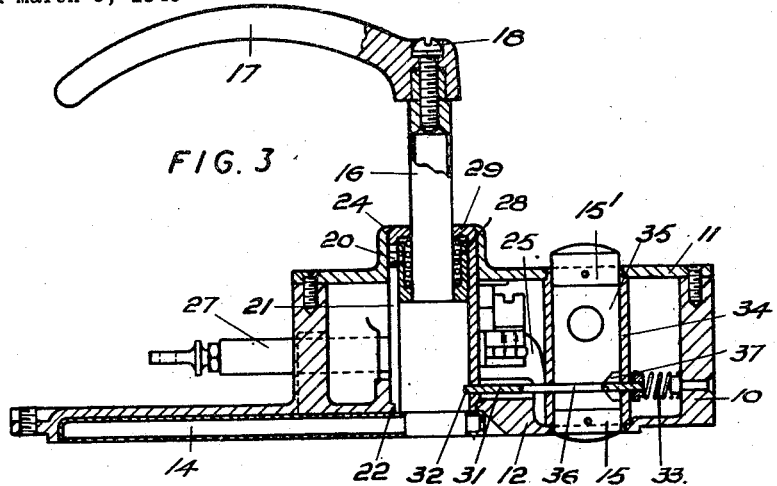
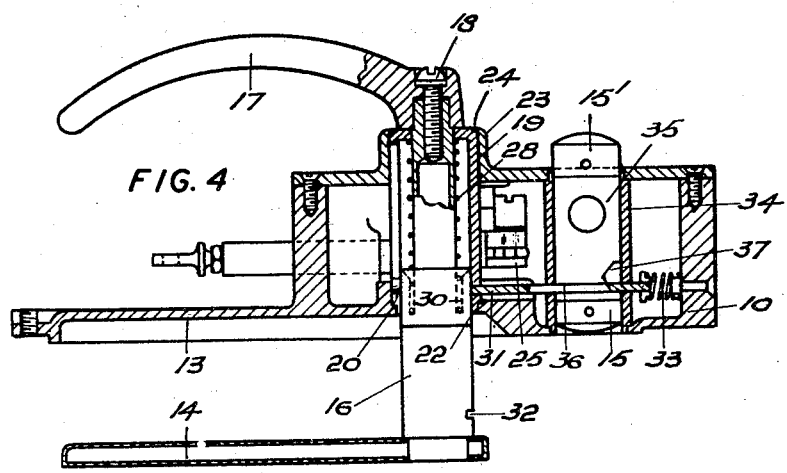
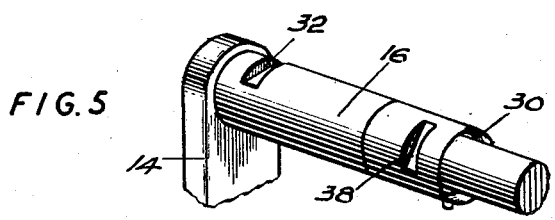
INVENTORS
BERT BRITTAIN
HENRY JAMES GOODWIN SQUIRE
by Walter S. Bleston
ATTORNEY Patented Nov. 1, 1949

2,486,586

UNITED STATES PATENT OFFICE 2,486,586

FLUSH HANDLE CONSTRUCTION

Bert Brittain and Henry James Goodwin Squire, Bloxwich, England

Application March 5, 1946, Serial No. 652,142
In Great Britain March 7, 1945

2 Claims. (Cl. 292—1)

1

This invention relates to improvements in handle-operated latch or lock mechanism for hatches, doors and the like. The invention is primarily intended for use on hatches or doors on aircraft but is also applicable to doors on vehicles or other doors wherever projection of an operating handle from one or other surface of the door may be undesirable or objectionable.

According to our invention a bolt or bolts for retaining a hatch or door in the closed position is or are adapted to be retracted by angular movement of a spindle having its axis at right angles to the plane of the door and having a handle on one or each end, the spindle being capable of axial movement to allow the handle or one handle to lie flush or substantially flush with the surface of the door or to be projected from the surface of the door for use in moving the spindle angularly to retract the bolt or bolts.

The spindle is loaded axially by a spring which urges the spindle in a direction to project the handle and when the door is closed the spindle is retained by a catch or detent in an axial position in which the handle is in the inoperative flush position. The catch may conveniently be controlled by a push-button or the like mounted in the casing of the latch adjacent to the handle, or it may be controlled from a remote point by mechanical, electrical or other means. Thus to open the door the push-button is pressed in to release the spindle and the handle is projected by the spring for use, and after the door has been closed the handle is simply pressed in again and is retained by the catch.

Preferably means are incorporated to prevent the handle from being pressed in to the flush position unless the bolt or bolts have been moved into the locked position.

Key-operated means may also be provided for locking the handle and/or spindle in the closed position.

For most applications there will be a handle on each end of the spindle so that the door can be opened from either side, the one handle being spaced from the adjacent surface of the door when the other is in a position flush with the other surface. For example, where the mechanism is applied to a hatch or door on aircraft the handle on the inside will normally be spaced from the inner surface of the hatch while the

2 outer handle will be flush with the outer surface of the hatch so that it lies within the contour of the outer surface of the aircraft and does not set up eddies or offer any resistance to the flow of air over that surface.

One practical form of lock in accordance with our invention designed for use on hatches on aircraft is illustrated by way of example in the accompanying drawings in which:

Figure 1 is a front elevation of the complete lock.

Figure 2 is a rear elevation with the cover removed.

Figure 3 is a longitudinal section on the line 3—3 of Figure 1 with the handles and spindle in the normal closed position.

Figure 4 is a similar section showing the outside handle projected for opening the hatch from the outside.

Figure 5 is a fragmentary perspective view of a portion of the spindle and outside handle.

In the lock illustrated the whole of the mechanism is housed in a hollow box-like casing 10 closed on its rear face by a detachable cover plate 11. The thickness of the casing is such that it can be received within the thickness of a hatch to which it is to be fitted. The body 10 of the casing and the cover 11 are conveniently formed as die-castings in light metal or alloy. The outer wall of the casing is adapted to be secured by screws or rivets to the outer skin of the hatch in which there is formed an opening to receive an elongated portion 12 of the wall which stands out from the rest of the wall by an amount equal to the thickness of the skin so that when the lock is in position the surface of the portion 12 is flush wih the outer surface of the skin.

The portion 12 is recessed as shown at 13 to receive a lever handle 14 of such a form as to be capable of lying wholly within the contour of the recess when pressed in. Also at one end of the portion 12 there is a circular opening into which a press-button 15 extends.

The handle 14 is secured on the outer end of a spindle 16 which is hollow to reduce weight and extends through the casing and cover. The other end of the spindle is reduced in diameter and has keyed on it a detachable handle 17, the length of the spindle being such that the handle 17 is normally spaced a substantial distance from the inner face of the hatch to allow it to be readily grasped as shown in Figure 3.

The handle 14 is shown as being formed from two sheet steel pressings copper—fused together, which makes a very light and strong handle, and the handle is copper—fused on to the outer end of the spindle which is shouldered down to receive it.

The handle 17 is shown as being a die-casting held on a square on the inner end of the handle 10 by a screw 18.

Surrounding the spindle within the casing is a sleeve 19 to which the spindle is slidably keyed by a radially projecting peg 20 on the spindle working in a longitudinal slot 21 in the sleeve so that the spindle can move axially within the sleeve but is located against relative angular movement. One end of the sleeve is shouldered down as shown at 22 and received in a circular opening in the outer wall of the casing while the other end of the sleeve is received in a hollow cylindrical boss 23 on the cover 11, the end of the boss being spun or swaged over as shown at 24 to retain the sleeve. The sleeve is thus located against axial movement but is free to move angularly. Welded or otherwise secured to the sleeve within the casing is a spider 25 having four angularly spaced arms 26 to which are pivotally connected the inner ends of plungers 27 adapted to be coupled by links to bolts for locking the hatch.

Four arms are shown for operating four bolts simultaneously but it will be understood that the spider may have one, two or three arms according to the number of bolts securing the hatch.

A coiled compression spring 28 is arranged around the reduced part of the spindle within the sleeve and abuts between a flange 29 on the sleeve and the bottom of an annular recess 30 in the spindle, the arrangement being such that the spring urges the spindle axially in a direction to move the handle 14 out of its recess into the projected position shown in Figure 4.

The spindle is retained in the position in which the handle lies in the recess by a locking bar 31 which is mounted to slide in the casing in a direction at right angles to the axis of the spindle.

One end of the bar extends through a part-circumferential slot in the sleeve into engagement with a notch 32 in the spindle, the bar being urged into the locking position by a spring 33 arranged between an abutment on the other end of the bar and the wall of the casing. The bar passes through diametrically opposed slots in the wall of a cylindrical shell 34 of which the ends are received in openings in the outer wall of the casing and in the cover. A cam plate 35 which is axially movable in the shell has on opposite ends push-buttons 15 and 15¹ which are a sliding fit in the shell. The cam plate extends through a longitudinal slot 36 in the bar 31 and has a notch 37 in one edge with oppositely inclined cam faces adapted to engage with one end of the slot 36 so that axial movement of the cam plate 35 in either direction caused by pressing in one of the push-buttons retracts the locking bar against the action of the spring 33.

When the parts are in their normal positions shown in Figure 3 the handle 14 lies in its recess 13, the spring 28 is compressed, the spindle 16 is held against axial movement by the engagement of the locking bar 31 with the notch 32 in the spindle, and angular movement of the sleeve 19 to withdraw the bolts is prevented by the fact that the sleeve is slidably keyed to the spindle which is held against angular movement by the engagement of the handle 14 in its recess. The hatch is thus effectively locked.

To open the hatch either of the push-buttons 15 or 15¹ is pressed in. This retracts the locking bar 31 which releases the spindle and allows the spring 28 to move the spindle and the handles into the position shown in Figure 4 in which the handle 14 is spaced sufficiently far from the casing to allow it to be readily grasped by the fingers. The spindle can then be moved angularly by either handle and the spindle takes with it the sleeve 19 which is moved angularly to retract the bolts.

In closing the hatch from the outside the handle 14 is simply turned into the closed position and pressed inwardly until it enters the recess 13 in the casing, and as the handle reaches this position the locking bar 31 re-engages in the notch 32 in the spindle and retains the handle 14 in the flush position until one of the push-buttons is operated again to release it.

In closing the hatch from the inside the handle 17 is simply turned into the closed position and pulled inwardly until the locking bar engages and retains the spindle.

Preferably the mechanism is so arranged that the outer handle cannot be pushed in unless it has been turned into the closed position. For this purpose a further notch 38 is formed in the spindle adjacent its inner end, this notch being spaced angularly from the notch 32 and located in such a position that it is engaged by the locking bar 31 when the handle 14 is projected and the spindle is in the angular position shown in dotted lines in Figure 1 corresponding to the retraction of the bolts. Angular movement of the spindle into the closed position moves the notch 38 out of alignment with the locking bar whereby the tangential base of the notch which is visible in Fig. 5 acts as a cam on the bar to urge it out of engagement with the notch against the restraint of spring 33 so that the spindle can then be pushed in. Thus the fact that the handle 14 is in the flush position is a positive indication that the hatch has been properly closed and locked.

We claim:

1. Lock mechanism comprising a casing, a bolt-operating spindle mounted for axial and angular movement in and extending through the casing, a handle on each end of the spindle for moving it angularly, a recess in one wall of the casing to receive one of said handles in one axial position of the spindle, spring means urging the spindle axially in a direction to project that handle from the recess for engagement by a hand, a notch in the spindle, a spring-pressed catch member which engages in said notch when the spindle is in such an axial position that the handle lies in the recess, and a further notch in the spindle with which said catch member engages when the handle is projected and the spindle is in an angular position corresponding to the release of the lock so that the spindle cannot be moved axially to carry the handle into the recess until the spindle has been moved angularly into the locking position.

2. Lock mechanism comprising a casing, a bolt-operating spindle mounted for axial and angular movement in and extending through the casing, a handle on each end of the spindle for moving it angularly, a recess in one wall of the casing to receive one of said handles in one axial position of the spindle, and to prevent it from turning, and a retractable detent to prevent axial movement of said spindle, said spindle embodying two means for engagement with said detent, one of said means being adapted for engagement when the spindle is in said first position, and the other of said means being axially and angularly spaced from the first-mentioned means for engagement when said spindle is projected and turned into a predetermined second position, said second means including means to urge said detent into a disengaging position by a turn of the spindle from its second position.

BERT BRITTAIN.
HENRY JAMES GOODWIN SQUIRE.

REFERENCES CITED

The following references are of record in the file of this patent:

UNITED STATES PATENTS

| Number | Name | Date |
|---|---|---|
| 1,898,975 | Quarnstrom | Feb. 21, 1933 |
| 2,036,154 | Littledale | Mar. 31, 1936 |
| 2,177,672 | Schock | Oct. 31, 1939 |
| 2,189,227 | Schock | Feb. 6, 1940 |
| 2,239,301 | Papst | Apr. 22, 1941 |
| 2,375,196 | Cederwall | May 8, 1945 |